(12) United States Patent
Gruper et al.

(10) Patent No.: US 8,555,394 B2
(45) Date of Patent: Oct. 8, 2013

(54) NETWORK SECURITY SERVER SUITABLE FOR UNIFIED COMMUNICATIONS NETWORK

(75) Inventors: Shimon Gruper, Haifa (IL); Gil Blumenfeld, Netanya (IL); Zeev Pritzker, Tel Aviv (IL); Shlomi Amor, Givatayim (IL)

(73) Assignee: VibeSec Ltd., Haifa (IL)

( * ) Notice: Subject to any disclaimer, the term of this patent is extended or adjusted under 35 U.S.C. 154(b) by 230 days.

(21) Appl. No.: 13/128,640

(22) PCT Filed: Nov. 15, 2009

(86) PCT No.: PCT/IL2009/001071
§ 371 (c)(1),
(2), (4) Date: May 11, 2011

(87) PCT Pub. No.: WO2010/055515
PCT Pub. Date: May 20, 2010

(65) Prior Publication Data
US 2011/0225656 A1    Sep. 15, 2011

Related U.S. Application Data

(60) Provisional application No. 61/115,034, filed on Nov. 15, 2008.

(51) Int. Cl.
| G06F 15/16 | (2006.01) |
| H04L 29/06 | (2006.01) |
| G06F 17/00 | (2006.01) |
| G06F 17/30 | (2006.01) |
| G06F 7/04  | (2006.01) |

(52) U.S. Cl.
USPC ........... 726/25; 726/1; 726/2; 726/16; 726/22

(58) Field of Classification Search
None
See application file for complete search history.

(56) References Cited

U.S. PATENT DOCUMENTS

| 7,441,429 | B1  |   | 10/2008 | Nucci et al.    |       |
|-----------|-----|---|---------|-----------------|-------|
| 7,636,937 | B1  | * | 12/2009 | Bhattacharya et al. | 726/2  |
| 7,900,251 | B1  | * | 3/2011  | Cheriton        | 726/16 |
| 2004/0260560 | A1 |  | 12/2004 | Holloway et al. |       |
| 2007/0143851 | A1 | * | 6/2007  | Nicodemus et al. | 726/25 |
| 2007/0177615 | A1 |   | 8/2007  | Miliefsky       |       |
| 2008/0052401 | A1 |   | 2/2008  | Bugenhagen et al. |    |
| 2008/0052541 | A1 |   | 2/2008  | Ginter et al.   |       |
| 2008/0072322 | A1 |   | 3/2008  | Guruswamy       |       |
| 2008/0240128 | A1 |   | 10/2008 | Elrod           |       |
| 2012/0167168 | A1 | * | 6/2012  | Orr et al.      | 726/1 |
| 2012/0278885 | A1 | * | 11/2012 | Hira et al.     | 726/22 |

OTHER PUBLICATIONS

International Search Report for PCT/IL2009/001071 issued Mar. 19, 2010 by USPTO as ISA.
Written Opinion of the International Searching Authority for PCT/IL2009/001071 issued Mar. 19, 2010 by USPTO as ISA.

* cited by examiner

*Primary Examiner* — Shin-Hon Chen
(74) *Attorney, Agent, or Firm* — Simon Kahn; Chanoch Kahn

(57) ABSTRACT

A network security server constituted of: a device detection functionality, the device detection functionality arranged to detect devices on a network on an ongoing basis; a state extraction functionality arranged to read the state of each of the detected devices; an abstraction functionality arranged to translate each of the read states to a common abstract format; a state analysis functionality arranged to compare each of the translated read states with a predetermined database of states; and a session control functionality arranged to control communication of each of the detected devices responsive to the comparison with the predetermined database of states.

22 Claims, 5 Drawing Sheets

| DEVICE | LOCATION | EXT # | USER | ROLE | RISK SCORE | ACTION |
|---|---|---|---|---|---|---|
| IP PHONE | LOBBY | ANY | ANY | PHONE | HIGH | RESTRICT CALL AREA |
| SOFTPHONE | FLOOR 5 | ANY | CEO | PHONE | LOW | UNRESTRICTED |
| ANY | ANY | 1103 | ANY | PHONE | MEDIUM | LIMIT REDIRECT |
| COMPUTER | FLOOR 2 | ANY | ANY | IP TEL. SERVER | LOW | LIMIT CALL VOLUME |
| CAMERA | PARKING LOT | ANY | SEC. OFF. | SECURITY CAMERA | HIGH | LIMIT REDIRECT |
| SOFTPHONE | MOBILE | ANY | JOHN SMITH | PHONE | HIGH | LIMIT CALL COST |

FIG. 3

NETWORK SECURITY SERVER SUITABLE FOR UNIFIED COMMUNICATIONS NETWORK

TECHNICAL FIELD

The invention relates generally to the field of unified communications, and more particularly to an apparatus and method for controlling security within a unified communications network.

BACKGROUND

The growth of unified communications (UC) and in particular voice over Internet Protocol (VoIP) telephony has led to the merger of voice, messaging, video and data networks, where multi-modal voice, video and/or other communication media have become simply applications running over a data network. The term UC as used herein is meant to include all modes of communication running over a packet network, comprising without limitation VoIP telephony, instant messaging, presence information, and video conferencing along with non real time communication services such as unified messaging. As data networks have grown, various threats to the security of the data networks have similarly grown, such as hacking, intrusion, viruses and malicious code all of which are aimed at penetrating and damaging, or subverting, the target data network and the information that it carries. Security for data networks has evolved primarily in the form of simple firewalls and application specific firewalls, such as session border controllers, which control the perimeter of the network and thus prevent unauthorized entry into the data network.

Unfortunately such security measures do not fully address the security needs of a UC network, at least in part because the firewalls and session border controllers do not monitor internal traffic within the network. In particular, a malicious user who has gained access to the network can reprogram any of the VoIP phones on the network from behind the firewall. For example, and without being limiting, a malicious user can: arrange to forward all calls from a VoIP phone to a different telephone number; enable the on-board microphone of the VoIP phone to send all detected sounds to a predetermined destination, thus eavesdropping on the area surrounding the VoIP phone; conference all calls with a predetermined destination, thus eavesdropping on all calls made or received; arrange to have a VoIP telephone or a compromised voice server dial large numbers of telephone numbers in search of a device that can be exploited, a process known as "war dialing"; or arrange for the VoIP telephone to generate automatically-dialed pre-recorded phone calls, a process known as spam over IP telephony (SPIT).

Another VoIP-related class of attacks may be directed at a VoIP call manager such as a softswitch, IP-Centrex server or IP-PBX, rather than at a VoIP terminal. A perpetrator of such VoIP call manager targeted attack may, for example and without being limiting, break into a voice mail system, change user privilege information and/or tamper with internal PBX cost tables in order to conceal costly fraudulent calls to international or premium service numbers.

Other UC network elements can be similarly exploited. For example, and without being limiting, a malicious user can divert or eavesdrop on traffic from an IP-based video surveillance cameras or tamper with a presence server in order to divert messaging, voice and video call traffic to a maliciously selected destination.

In addition to the above threats of targeted attacks on a single mode of communication, perpetrators may effect more complex cross-modality attacks in the event that multi-modal communication is enabled by the UC network. For example, and without being limiting, the attacker may compromise a VoIP terminal and then use the compromised VoIP terminal to attack data systems attached to the same network. In another non-limiting example, the attacker may use a compromised smartphone attached to a UC network in order to attack a call manager or steal credit card information.

In addition to the above simple or complex direct attacks at the various modalities of UC that take place at layers 5, 6 and 7, i.e. at the session, presentation and application layers of the OSI Reference Model, respectively, perpetrators may exploit vulnerabilities of the lower layers of data communication networks, such as layer 4 (transport layer), layer 3 (network layer) and even layer 2 (the data link layer). One non-limiting example of the latter is a vulnerability of an IP network to the so-called "ARP poisoning" attack that results in a change of internal routing tables of network terminals, among them personal computers, VoIP phones and video cameras, allowing the perpetrator to perform a Layer 2 based "man in the middle" attack by routing all traffic through a malicious computer attached to the same network. In particular, the freely available "Cain and Abel" hacking software can be used to perform unauthorized recording of VoIP conversations between any two IP telephones attached to the same IP subnetwork.

The UC attack surface available to perpetrators is further expanded by the non-uniform treatment of security by manufacturers of the various UC servers and terminals and a variety of devices and the associated vendor specific threats, resulting in difficult to detect threats when such devices are mixed on the same UC network.

What is desired, and not provided by the prior art, is a security apparatus and method which is operative behind a firewall or session border controller to monitor and maintain security of UC network communication preferably including security of the variety of elements engaged in switching, routing, serving and terminating Unified Communication traffic.

SUMMARY

Accordingly, it is a principal object of the present invention to overcome at least some of the disadvantages of prior art security methods for UC networks. This is accomplished in certain embodiments by providing a security server comprising a vendor-agnostic UC device detection functionality arranged to discover and monitor devices on the network on an ongoing basis; a state detection functionality arranged to read and store the operating state of each of the detected UC devices on the network; an abstraction functionality arranged to translate the monitored operating state and device information into a common abstract format; a state analysis functionality arranged to compare the translated operating state with a predetermined database and develop a multi-dimensional policy responsive thereto; and a session interrupt functionality arranged to interrupt a session from at least one of the detected devices if required by the policy.

Preferably, the provided security server provides protection against single-mode, multi-modal, cross-modal, cross-layer and multi-layer attacks while providing a unified treatment of security for UC networks comprised of devices from a plurality of vendors.

In an exemplary embodiment a network security server iss provided comprising: a device detection functionality, the device detection functionality arranged to detect devices on a network on an ongoing basis; a state extraction functionality arranged to read the state of each of the detected devices; an abstraction functionality arranged to translate each of the read states to a common abstract format; a state analysis functionality arranged to compare each of the translated read states with a predetermined database of states; and a session control functionality arranged to control communication of each of the detected devices responsive to the comparison with the predetermined database of states.

In one particular embodiment the state analysis functionality is arranged to provide a security risk score for each of the detected devices responsive to the comparison with the predetermined database of states, and wherein the session control functionality controls communication responsive to the security risk score. In one further embodiment the control of communication comprises: selecting for each of the detected devices, responsive to the security risk score, a particular one of a predetermined plurality of policies; and limiting communication for each of the detected devices responsive to the particular policy. In another further embodiment, the network security server further comprises: a store functionality arranged to store a representation of the read state for each of the detected devices; and a compare functionality arranged to compare the change between the present state and the stored state for each of the detected devices, the state analysis functionality arranged to adjust the security risk score responsive to the compared change.

In one particular embodiment the devices detected by the device detection functionality are unified communication devices. In another particular embodiment the state read by the state extraction functionality comprises at least one of: Internet Protocol traffic routing information; voice traffic routing; firmware version; communication mode; manufacturer; model; device identity; and device activity.

In one particular embodiment the session control functionality is operative to command a network switch to shut down a port associated with a particular one of the detected devices responsive to the comparison, thereby controlling the communication of the particular one of the detected devices. In another particular embodiment the session control functionality is operative to command a call manager to disconnect an active communication from a particular one of the detected devices responsive to the comparison, thereby controlling the communication from the particular one of the detected devices.

In one particular embodiment the session control functionality is operative to transmit one of a reset command and an application session terminate command to a particular one of the detected devices thereby controlling the communication of the particular one of the detected devices. In another particular embodiment the network security server further comprises a device programming functionality arranged to program each of the detected devices to transmit changes of state to the state extraction functionality.

In one particular embodiment the network security server further comprises an override functionality arranged to monitor session control commands output by at least one of the detected devices and adjust a security setting responsive thereto. In another particular embodiment the control of communication comprises one of: allowed communication; limitation on amount of calls; limitation on allowed destinations of calls; limitation on allowed redirection of calls; and adjustment of a password for the detected device.

Independently, in certain embodiments a computer-readable medium containing instructions for controlling an electronic device to perform a method of network security is provided, the method comprising: detecting, on an ongoing basis, devices on a network; reading the state of each of the detected devices; translating each of the read states to a common abstract format; comparing each of the translated read states with a predetermined database of states; and controlling communication of each of the detected devices responsive to the comparison with the predetermined database of states.

In one particular embodiment the method further comprises: providing a security risk score for each of the detected devices responsive to the comparison with the predetermined database of states, wherein the controlling of the communication is responsive to the provided security risk score. In one further embodiment the controlling of the communication comprises: selecting for each of the detected devices, responsive to the security risk score, a particular one of a predetermined plurality of policies; and commanding at least one of the detected devices to limit communication responsive to the particular policy. In another further embodiment the method further comprises: storing a representation of the read state for each of the detected devices; comparing the change between the present state and the stored state for each of the detected devices; and setting the security risk score at least partially responsive to the compared change.

In one particular embodiment the read state of the method comprises at least one of: Internet Protocol traffic routing information; voice traffic routing; firmware version; communication mode; manufacturer; model; device identity; and device activity. In another particular embodiment the controlling of communication of the method comprises: commanding a network switch to shut down a port associated with a particular one of the detected devices responsive to the comparing.

In one particular embodiment the controlling of the communication of the method comprises: commanding a call manager to limit communication for one of the detected devices. In another particular embodiment the controlling of communication of the method comprises: commanding a call manager to disconnect an active communication from a particular one of the detected devices responsive to the comparing.

In one particular embodiment the controlling of communication of the method comprises: transmitting one of a reset command and an application session terminate command to a particular one of the detected devices. In another particular embodiment the method further comprises: programming at least one of the detected devices to transmit changes of state to the state extraction functionality.

In one particular embodiment the method further comprises: monitoring session control commands for at least one detected device; and adjusting a security setting for the at least one detected device responsive thereto. In another particular embodiment the controlling of communication of each of the detected devices comprises at least one of: allowing communication; limiting amount of calls; limiting allowed destinations of calls; limiting allowed redirection of calls; and adjusting a password for the detected device.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 illustrates an embodiment of a plurality of policies associated with a risk score according to certain embodiments;

DETAILED DESCRIPTION OF THE PREFERRED EMBODIMENTS

Figure 1:
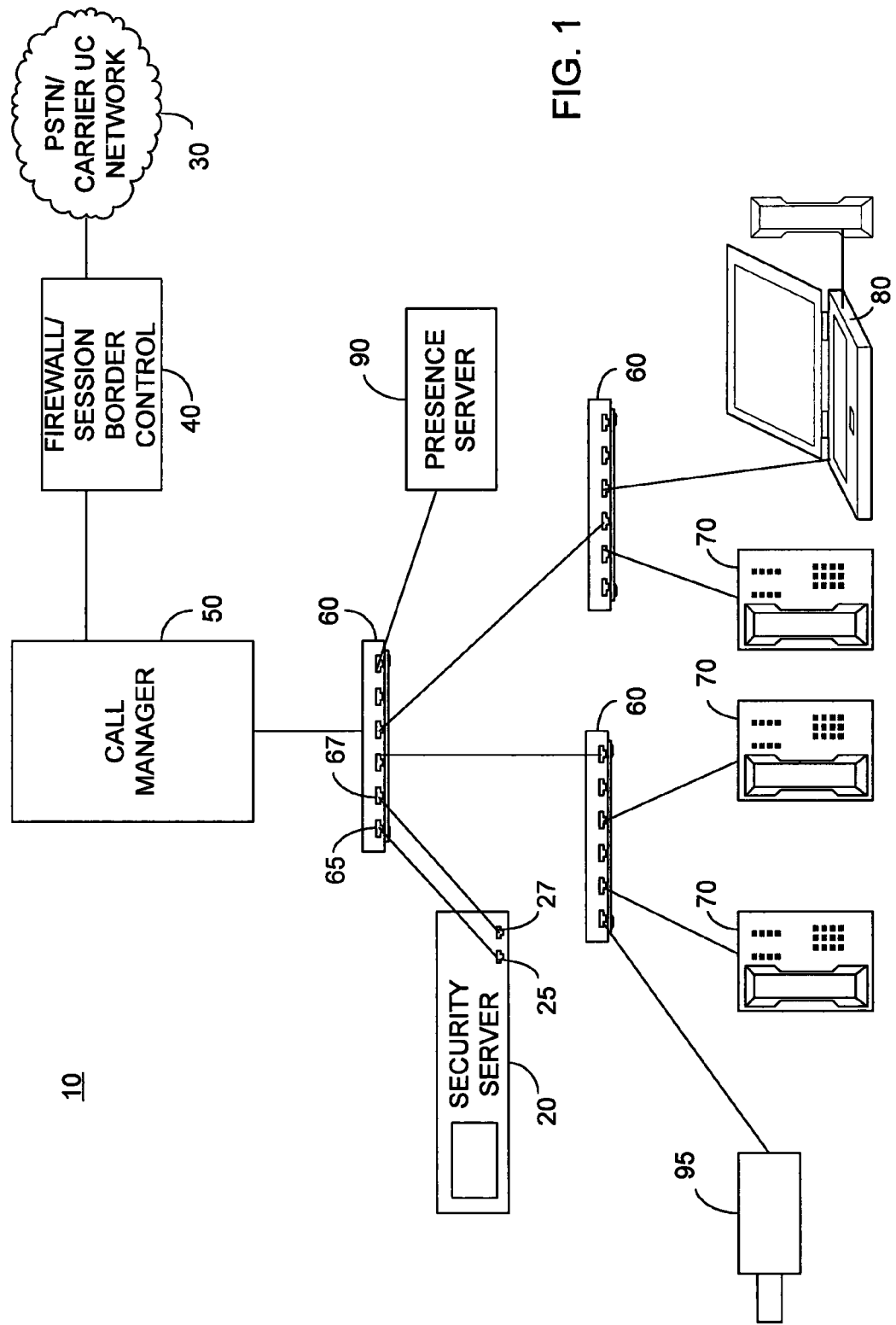
FIG. 1 illustrates a high level block diagram of a network arrangement comprising a security server according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a network arrangement 10 comprising a security server 20 according to certain embodiments, network arrangement 10 further comprising: a public switched telephone network (PSTN) or carrier UC network 30; a session border control or application aware firewall 40; a call manager 50; a plurality of network switches 60; a plurality of IP telephones 70; a soft-phone 80; a presence server 90; and a surveillance or videoconferencing camera 95. PSTN or carrier UC network 30 is connected via session border control or application aware firewall 40 to call manager 50 through an IP or circuit-switched interface, for which purpose call manager 50 may incorporate a media gateway. Call manager 50 is connected via a first network switch 60 to security server 20 and to presence server 90 and via additional network switches 60 to each IP telephone 70, to soft-phone 80 and to surveillance or videoconferencing camera 95. Security server 20 is illustrated as having two ports for connection to first network switch 60, denoted respectively port 25 and 27, respectively connected to ports 65 and 67 of first network switch 60, however this is not meant to be limiting in any way. In one particular embodiment, port 25 of security server 20 is set to promiscuous mode, i.e. data appearing at port 25, irrespective of destination address, is read into security server 20, and port 65 of first network switch 60 is set to mirror mode in which all activity passing through first network switch 60 is transmitted to port 25 of security server 20. In another embodiment only particular traffic, such as all traffic to call manager 50, is mirrored to port 65. Port 27 of security server 20, connected to port 67 of first network switch 60 is used for session control, as will be described further hereinto below. Security server 20 is illustrated as being connected to first network switch 60 which is directly connected to call manager 50, thus ensuring that all traffic directed to, or sent from call manager 50 is mirrored by port 65 to security server 20, however this is not meant to be limiting in any way, and simply illustrates a preferred embodiment.

In operation, as will be described further hereinto below, security server 20 is operative to detect, on an ongoing basis, each device connected to network arrangement 10. Security server 20 is further operative to read the state of each of the detected devices, and preferably translate the read state to an abstract format. Security server 20 is then further operative to determine action for each of the detected devices, responsive to the security risk presented by the read state, and implement the determined action. Advantageously, security server 20 is operative to determine security risk inter alia by noting states in various network layers and states in various communication channels, and particularly changes thereof.

In one illustrative non-limiting embodiment, security server 20 is operative to control telephone calls from a particular one of the IP telephones 70, or soft-phone 80, by noting each call session and monitoring the calling session in respect to the respective device, to: restrict the calling area; limit daily call volume to a predetermined volume; or limit the allowed daily toll charges to a predetermined value. Any excursion outside of the allowed limits is controlled by interrupting the session. In another illustrative non-limiting embodiment, security server 20 is operative to control telephone calls from a particular one of the IP telephones 70, or soft-phone 80, by commanding the IP telephone 70 or soft-phone 80 to limit call redirection to a predetermined list of allowed destinations or adjust a password setting.

Figure 2:
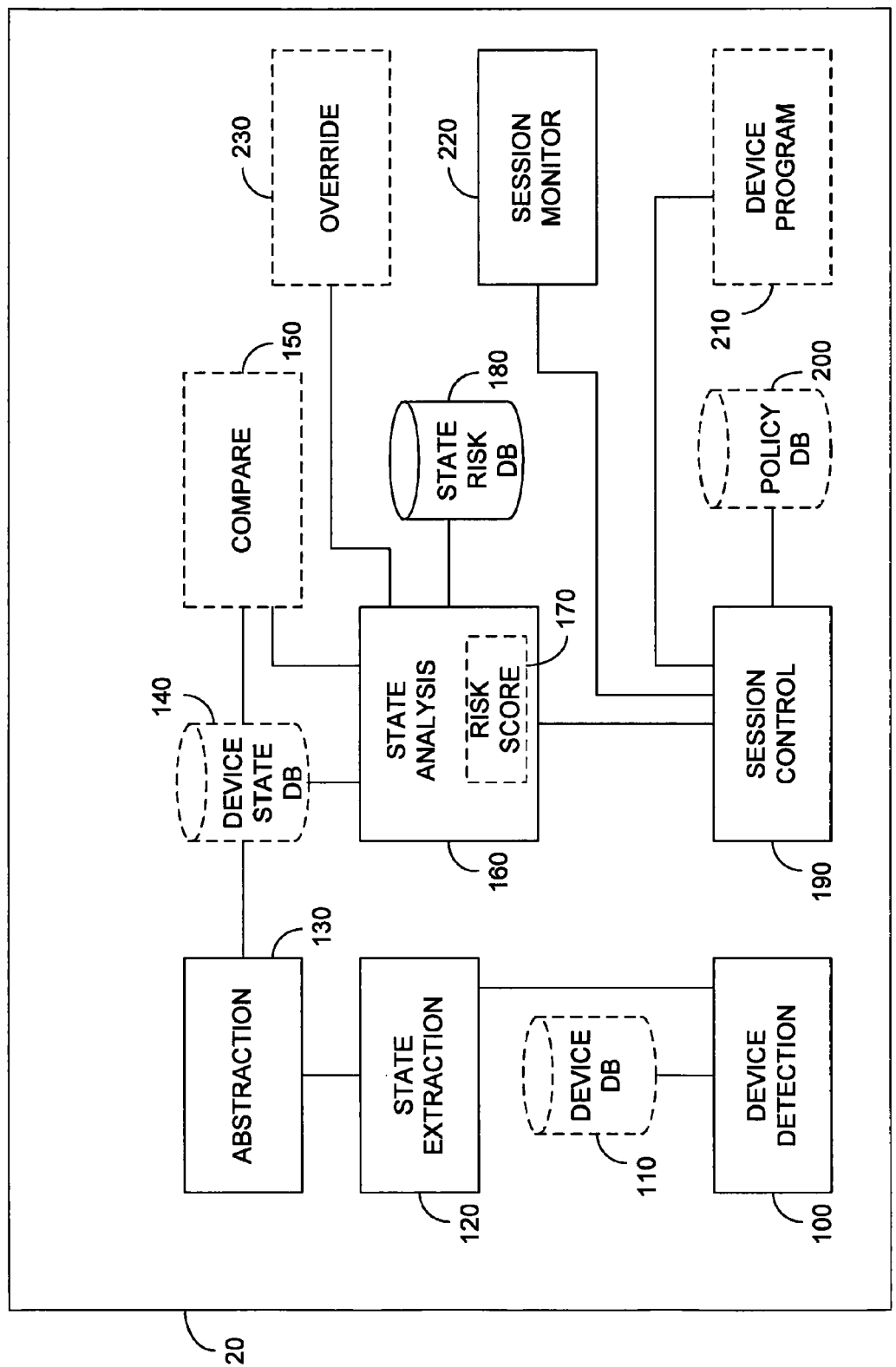
FIG. 2 illustrates a high level functional block diagram of an embodiment of the security server of FIG. 1.

FIG. 2 illustrates a high level functional block diagram of an embodiment of security server 20 of FIG. 1 comprising: a device detection functionality 100; an optional device database 110; a state extraction functionality 120; an abstraction functionality 130; an optional device state database 140; an optional compare functionality 150; a state risk analysis functionality 160 comprising an optional security risk score assignment functionality 170; a state risk database 180; a session control functionality 190; an optional policy database 200; an optional device program functionality 210; a session monitor functionality 220; and an optional override functionality 230. Each of device detection functionality 100;

optional device database 110; state extraction functionality 120; abstraction functionality 130; optional device state database 140; optional compare functionality 150; state risk analysis functionality 160; optional security risk score assignment functionality 170; state risk database 180; session control functionality 190; optional policy database 200; optional device program functionality 210; session monitor functionality 220; and optional override functionality 230 may be implemented in special purpose hardware or in a general server having both a processor and memory, without exceeding the scope. Optional portions of security server 20 have been marked with dashed lines for clarity.

Device detection functionality 100 is in communication with device database 110 and with state extraction functionality 120. State extraction functionality 120 is in communication with abstraction functionality 130, and abstraction functionality 130 is further in communication with device state database 140. Device state database 140 is in communication with compare functionality 150 and with state risk analysis functionality 160, and compare functionality 150 is further in communication with state risk analysis functionality 160. State risk analysis functionality 160 is in communication with state risk database 180, with session control functionality 190 and with override functionality 230. Session control functionality 190 is in communication with policy database 200, with device program functionality 210 and with session monitor functionality 220.

In operation, device detection functionality 100 is operative on an ongoing basis to detect any devices connected to network arrangement 10. Upon detection of the device, the device detection is communicated to state extraction functionality 120. Device database 110 preferably comprises an updatable database of potential relevant devices, including communication protocols and procedures. Preferably devices detected by device detection functionality 100 include all devices which may be programmed within a UC network, such as network arrangement 10.

State extraction functionality 120 is thus operative to first contact the detected device, preferably on the TCP/IP port, or ports, that are found to be open. Identification of the ports which were found to be open by device detection functionality 100 provides initial information regarding the nature of the detected device. State extraction functionality 120 further queries the detected device to determine if it meets the signature of one of the devices listed in device database 110.

Advantageously, device database 110 preferably comprises protocols, responses, methods and procedures for communicating with and extracting information of each potential UC device of interest detected on network arrangement 10.

State extraction functionality 120 is thus operative to read the state of each of the UC devices detected by device detection functionality 110. It is to be understood that state extraction functionality 120 is operative on an ongoing basis to read the state of each device detected by device detection functionality 110. Thus, changes in state will be detected by security server 20, as will be described further hereinto below.

Abstraction functionality 130 is operative to receive the read state from state extraction functionality 120 and to translate the read state to an abstract format common to all devices of a similar type. Abstraction functionality 130 is advantageous in that it allows for uniform handling of all devices of a similar functionality, irrespective of manufacturer or model number. Abstraction functionality 130 is preferably operative to store the translated read state in device state database 140, associated with a device identifier. In an exemplary embodiment the device identifier further comprises information such as: location and user ID associated with the detected device, the information typically obtained from a registrar database (not shown) of network arrangement 10. Compare functionality 150 is operative to compare each instance of a stored translated read state with the previous instance of the stored translated read state for the same device, responsive to the device identifier. In the event of a change in state, the change is communicated to state risk analysis functionality 160, as will be described further hereinto below.

State risk analysis functionality 160 is operative to input the translated read device state from device state database 140, and in cooperation with state risk database 180, determine the amount of security risk associated with the translated read device state. In an exemplary embodiment, state risk analysis functionality 160 compares the translated read device state with a database of potential device states stored on state risk database 180. In one embodiment, for each potential device state a security risk score is further assigned on state risk database 180. In another embodiment, risk score assignment functionality 170 is arranged to determine a risk score responsive to data stored on state risk database 180. Changes in state, as received from compare functionality 150 are further preferably used by state risk analysis functionality 160 to determine security risk, and optionally a security risk score. In an exemplary embodiment, state risk database 180 further comprises a list of state changes associated with increased risk, and state risk analysis functionality 160 is operative to adjust the security risk associated with the present state by the increased risk adjustment associated with the state change. State risk analysis functionality 160 is preferably operative to determine security risk by noting states in various network layers and states in various communication modes, and particularly changes thereof and cross-mode or cross-layer data injections.

Session control functionality 190 receives the device identification and the risk information from state risk analysis functionality 160, with the optional risk score, and is operative in cooperation with policy database 200 to determine session control parameters for the detected device. In an exemplary embodiment, in the event state risk analysis functionality 160 indicates that the detected device can be programmed to transmit changes in state to security server 20, session control functionality 190 is operative to program the device to transmit changes in state. Such a transmission reduces the load on state extraction functionality 120, which is not required to regularly read the state of such a device. In an exemplary embodiment, state extraction functionality 120 receives a command from session control functionality 190 to set a flag that the device for which state changes are transmitted is to be polled and read less often, or in another embodiment not at all.

Session control functionality 190 is operative to identify in the policy DB 200 a particular policy for each device responsive to the security risk information, and optional security risk score, received from state risk analysis functionality 160. Session monitor functionality 220 is operative to detect the beginning of a session by any detected device within the UC network, and notify session control functionality 190 to implement a security rule or action Referring now to FIG. 3, we see an illustrative table of devices, locations, extension numbers, user ID, security risk, and actions. The table is meant to illustrate in a simple manner a multi-dimensional security policy table, and is not meant to be limiting in any way. In the first row of the table of FIG. 3, we find that an IP Phone, in location lobby, communicating with any extension number associated with any user, is identified as a telephone with high risk. As a result, an action is dictated to restrict the call area to a predetermined range. In one embodiment, the IP Phone is commanded to only allow calling to numbers in the predetermined range. In another embodiment call manager 50 is commanded to restrict calling to numbers in the predetermined range. In an exemplary embodiment, any excursion experienced outside of the predetermined rules, is responded to by session control functionality 190 shutting down the device. In one embodiment, shutting down the device is accomplished by session control functionality 190 sending an Internet Protocol reset command to the offending device, in another embodiment shutting down the device is accomplished by session control functionality 190 sending an application session terminate command to the offending device, in another embodiment the port of the appropriate network switch 60 is shut down by session control functionality 190, and in yet another embodiment call manager 50 is programmed by session control functionality 190 to shut down the session associated with the offending device.

There is no limitation to the potential actions, and potential actions may include, without limitation, transmitting a reset to the offending device, disconnecting an active call after a predetermined time period, limiting call volume to a predetermined volume, limiting call destination, limiting call redirection or adjusting a password.

In the second row of the table of FIG. 3, we find that a soft-phone on floor 5, communicating with any extension number, and associated with the CEO, is identified as a telephone with low risk. As a result, an action is dictated to allow unrestricted calling.

In the third row of the table of FIG. 3, we find that any detected device, in any location, communicating with extension number 1103, and associated with any user, is identified as a telephone with medium risk. As a result, an action is dictated to limit redirection of calls.

In the fourth row of the table of FIG. 3, we find that a detected computer, on the second floor, communicating with any extension number, and associated with any user, is identified as an IP telephone server with low risk. As a result, an action is dictated to limit call volume to a predetermined value within 150% of the average historical value.

In the fifth row of the table of FIG. 3, we find that a detected camera, such as surveillance camera 95 of FIG. 1, located in a parking lot, communicating with any extension number, and associated with a security office, is identified as a security camera with high risk. As a result, an action is dictated to limit camera redirect to be over a predetermined area, thus preventing unwanted black out of an area by redirection of the security camera.

In the sixth row of the table of FIG. 3, we find that a detected soft-phone, such as soft-phone 80 of FIG. 1, with a mobile location, communicating with any extension number, and associated with a particular registered user, indicated as John Smith, is identified as a phone with high risk. As a result, an action is dictated to limit call cost to a predetermined value over a predetermined period.

Override functionality 230 is operative to implement potential remediation schemes responsive to the determined amount of security risk associated with the translated read device state of state risk analysis functionality 160. In one non-limiting embodiment, override functionality 230 is operative to transmit a voice message to a high risk device, the voice message announcing that a particular code is to be dialed by a user to obtain access to the network. Thus, in the event that the high risk device has been compromised, no user will be available to input the particular code and access will be blocked. In yet another embodiment, override functionality 230 monitors dialing commands sent from a device to call manager 50, and upon recognition of a predetermined security access code adjusts the risk profile of state analysis functionality 160. In a non-limiting example in which a device has been blocked, responsive to contact with a security officer, the device may thus be unblocked by a predetermined security access code given to the user by the security officer.

Figure 4:
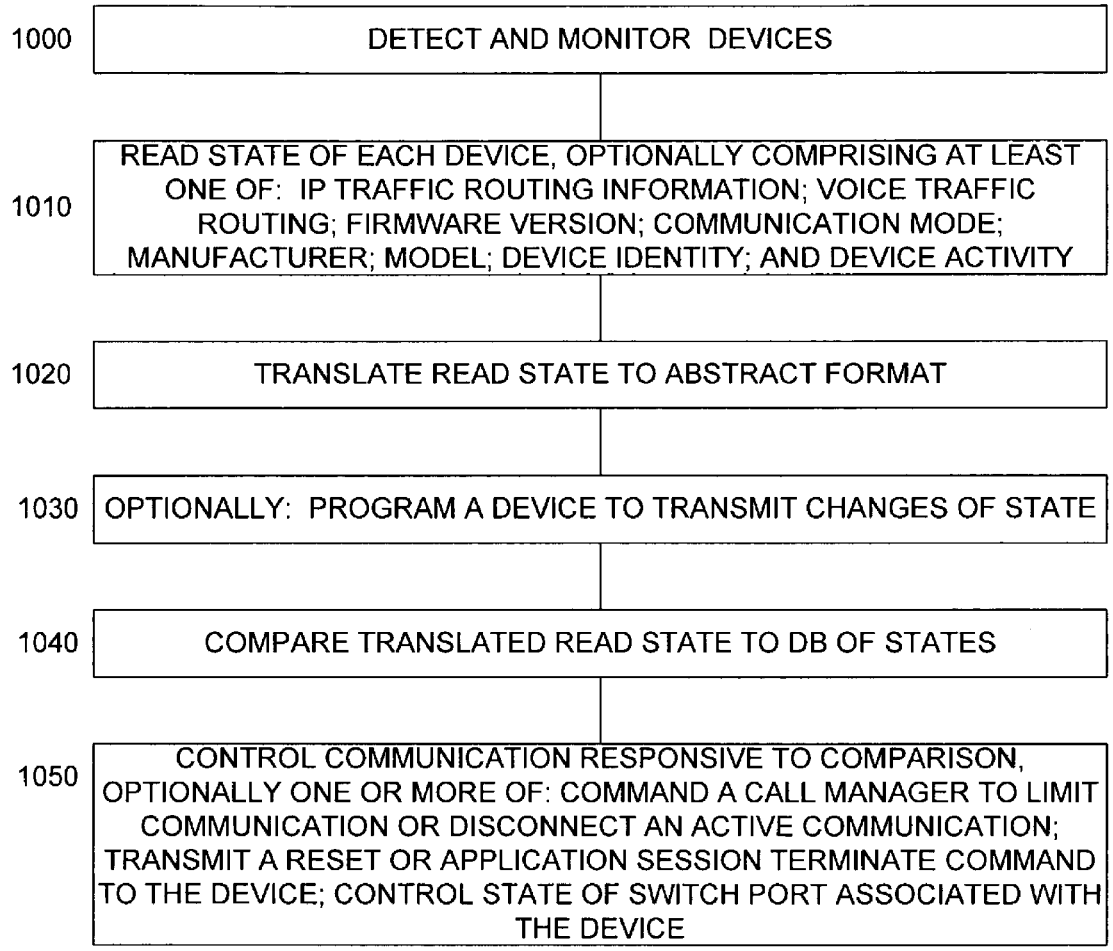
FIG. 4 illustrates a high level flow chart of a method of network security according to certain embodiments.

FIG. 4 illustrates a high level flow chart of a method of network security according to certain embodiments, suitable for use by security server 20 of FIGS. 1, 2. The method of FIG. 4 is in one embodiment provided on a computer readable medium. In stage 1000, devices of the network, such as network arrangement 10, are detected and monitored on an ongoing basis. In stage 1010, states of each device are read. Optionally the read states comprise at least one of: IP traffic routing information; voice traffic routing; firmware version; communication mode; manufacturer; model; device identity; and device activity.

In stage 1020, the read device state of stage 1010 is translated to an abstract format. Advantageously, as indicated above, an abstract format allows for comparison and uniform rules for all devices providing similar functionality, irrespective of the source thereof. In optional stage 1030, at least one of the detected devices of stage 1000 is programmed to transmit any changes of state. Such a transmission reduces the load required by the periodic operation of stage 1010.

In stage 1040, the translated read state of stage 1020 is compared to a database of states, preferably to determine a risk profile associated with the translated read state. In stage 1050, the risk profile of stage 1040 or other result of the comparison, in combination with other device parameters, as described above in relation to FIG. 3 are analyzed, and a communication control is determined and implemented responsive to the comparison of stage 1040. Optionally, the communication control comprises one or more of: command a call manager to limit communication or disconnect an active communication associated with a particular discovered device; transmit a reset or application session terminate command to a particular discovered device; and control the state of a network switch port associated with the particular discovered device. Preferably the communication control is responsive to a plurality of potential rules, including but not limited to: allow communication without restriction for a particular discovered device; limit call volume to a predetermined call volume for a particular discovered device; limit call destination to a predetermined range of destinations for a particular discovered device; limit call redirection to a predetermined range of allowed redirection targets for a particular discovered device; and adjust the password of a particular discovered device.

Figure 5:
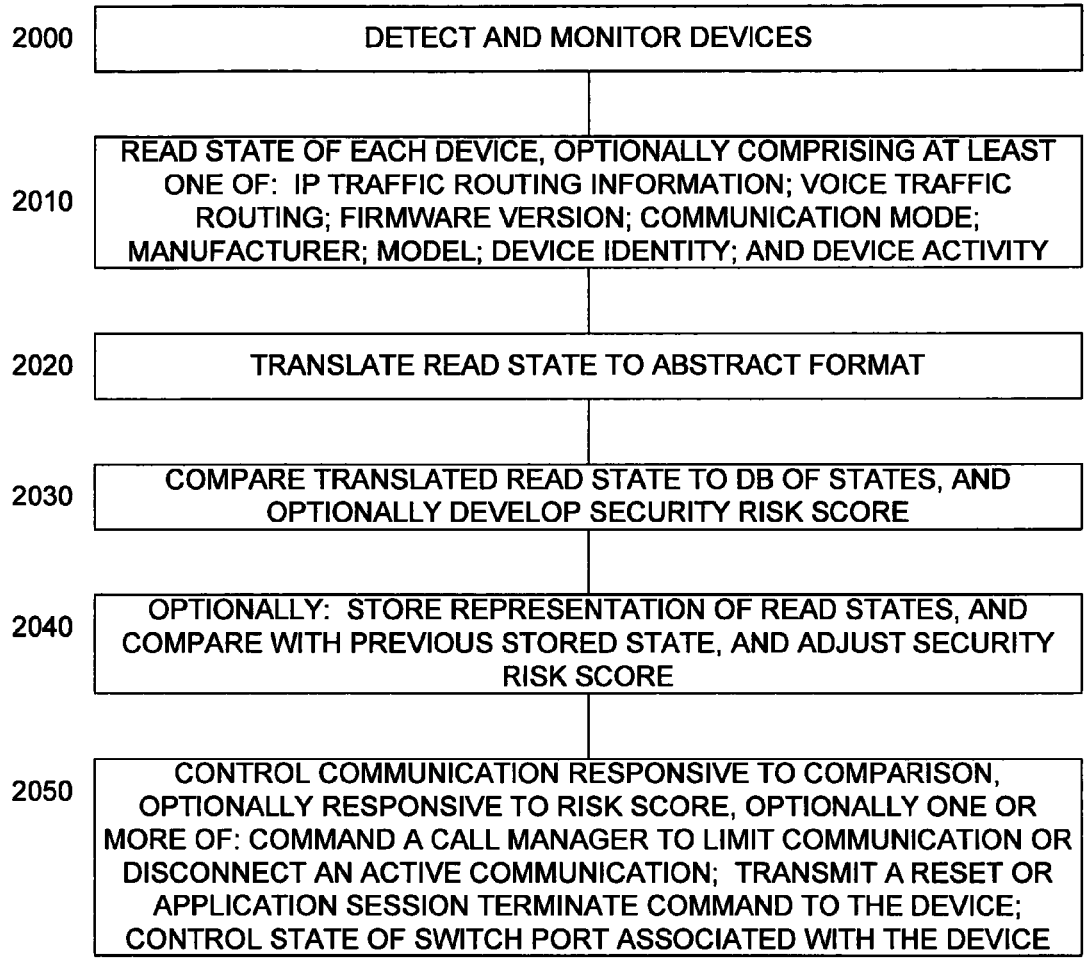
FIG. 5 illustrates a high level flow chart of a method of network security responsive to a security risk score according to certain embodiments.

FIG. 5 illustrates a high level flow chart of a method of network security responsive to a security risk score according to certain embodiments, suitable for use by security server 20 of FIGS. 1, 2. The method of FIG. 5 is in one embodiment provided on a computer readable medium. In stage 2000, devices of the network, such as network arrangement 10, are detected and monitored on an ongoing basis. In stage 2010, states of each device are read. Optionally the read states comprise at least one of: IP traffic routing information; voice traffic routing; firmware version; communication mode; manufacturer; model; device identity; and device activity.

In stage 2020, the read device state of stage 2010 is translated to an abstract format. Advantageously, as indicated above, an abstract format allows for comparison and uniform rules for all devices providing similar functionality, irrespective of the source thereof In stage 2030, the translated read state of stage 2020 is compared to a database of states, preferably to determine a security risk score associated with the translated read state. In optional stage 2040, a representation of the read states are stored, and compared with previously stored values. Changes in the representation of the translated read states are used to adjust the security risk score of stage 2030. Preferably, the stored representation is the translated read state of stage 2020, however this is not meant to be limiting in any way, and the read state may be stored, or a representation thereof, without exceeding the scope.

In stage 2050, the security risk score of stage 2030, as optionally modified by stage 2040, in combination with other device parameters, as described above in relation to FIG. 3 are analyzed, and a communication control is determined and implemented responsive to the security risk score. Optionally, the communication control comprises one or more of: command a call manager to limit communication or disconnect an active communication associated with a particular discovered device; transmit a reset or application session terminate command to a particular discovered device; and control the state of a network switch port associated with the particular discovered device. Preferably the communication control is responsive to a plurality of potential rules, including but not limited to: allow communication without restriction for a particular discovered device; limit call volume to a predetermined call volume for a particular discovered device; limit call destination to a predetermined range of destinations for a particular discovered device; limit call redirection to a predetermined range of allowed redirection targets for a particular discovered device; and adjust the password of a particular discovered device.

Figure 6:
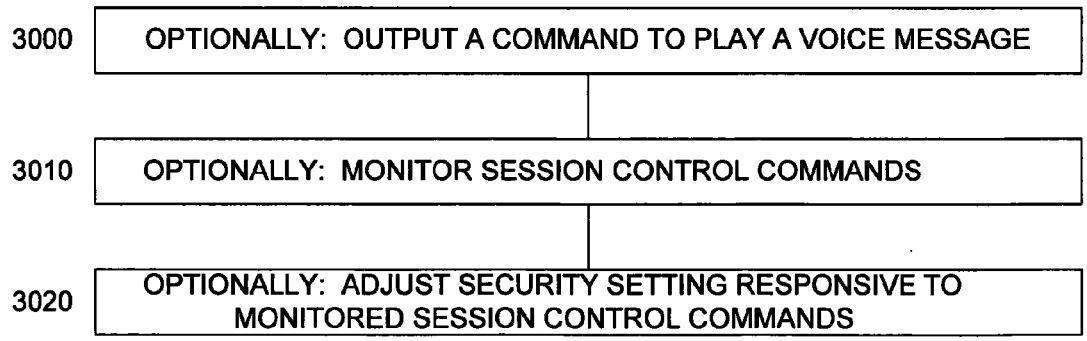
FIG. 6 illustrates a high level flow chart of a method of adjusting a security setting responsive to monitored session control commands.

FIG. 6 illustrates a high level flow chart of a method of adjusting a security setting responsive to monitored session control commands. In optional stage 3000, a command is output to play a voice message, requesting that a user associated with a detected device respond with a predetermined sequence of input commands. Such a voice message is in all respects similar to a completely automated public Turing test to tell computers and humans apart. In another embodiment, in which a device may be locked, a code held by a security office is passed to a user associated with the locked device, and the code is entered as session control commands, typically as dialed digits.

In stage 3010 session control commands are monitored, such as by override functionality 230, to determine if the response to optional stage 3000 is received within a predetermined time frame, or alternatively whether a predetermined security bypass code has been entered.

In stage 3020, responsive to the monitored session control command of stage 3010, a security setting associated with the device is adjusted. In one non-limiting example, a blocked device may be unblocked responsive the received code.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A network security server comprising:
a device detection functionality, said device detection functionality arranged to detect devices on a network on an ongoing basis;
a state extraction functionality arranged to read the state of each of the detected devices;
a store functionality arranged to store a representation of the read state for each of the detected devices;
a compare functionality arranged to compare a representation of the present state of each of the detected devices to the respective stored state representation of each of the detected devices and identify any state changes for each of the detected devices responsive to the comparison of the present state with the stored state;
a state risk analysis functionality in communication with said compare functionality, said state risk analysis functionality arranged to compare the representation of the read state for each of the detected devices with a predetermined database of states and to output security risk information associated with a device identifier for each of the detected devices, said security risk information responsive to said comparison with the predetermined database of states and further responsive to said identified state changes of said compare functionality; and
a session control functionality in communication with said state risk analysis functionality and arranged to control communication of each of the detected devices responsive to the device identifier and said security risk information.

2. The network security server according to claim 1, wherein said state security risk information comprises a security risk score.

3. The network security server according to claim 2, wherein said control of communication comprises:
selecting for each of the detected devices, responsive to said security risk score, a particular one of a pre-determined plurality of policies; and
limiting communication of each of the detected devices responsive to said selected particular policy.

4. The network security server according to claim 1, wherein the devices detected by said device detection functionality are unified communication devices and wherein the state read by said state extraction functionality comprises at least one of: Internet Protocol traffic routing information; voice traffic routing; firmware version; communication mode; manufacturer; model; device identity; and device activity.

5. The network security server according to claim 1, wherein the state read by said state extraction functionality comprises at least one of: Internet Protocol traffic routing information; voice traffic routing; firmware version; communication mode; manufacturer; model; device identity; and device activity.

6. The network security server according to claim 1, wherein said session control functionality is arranged to command a network switch to shut down a port associated with a particular one of the detected devices responsive to the device identifier and said security risk information, thereby controlling the communication of the particular one of the detected devices.

7. The network security server according to claim 1, wherein said session control functionality is arranged to command a call manager to disconnect an active communication from a particular one of the detected devices responsive to the device identifier and said security risk information, thereby controlling the communication of the particular one of the detected devices.

8. The network security server according to claim 1, wherein said session control functionality is arranged to transmit one of a reset command and an application session terminate command to a particular one of the detected devices responsive to the device identifier and said security risk information, thereby controlling the communication of the particular one of the detected devices.

9. The network security server according to claim 1, further comprising a device programming functionality arranged to program at least one of the detected devices to transmit changes of state to said state extraction functionality.

10. The network security server according to claim 1, further comprising an override functionality arranged to monitor session control commands output by at least one of the detected devices and adjust a security setting responsive thereto.

11. The network security server according to claim 1, wherein said control of communication comprises one of: allowed communication; limitation on amount of calls; limitation on allowed destinations of calls; limitation on allowed redirection of calls; and adjustment of a password for the detected device.

12. The network security server according to claim 1, further comprising:
an abstraction functionality arranged to translate each of the read states to a common abstract format,
wherein the stored representation of the read state is the translated read state and the representation of the present state is the translated present state.

13. A non-transitory computer-readable medium containing instructions for controlling an electronic device to perform a method of network security, the method comprising:
detecting, on an ongoing basis, devices on a network;
reading the state of each of said detected devices;
storing a representation of said read state for each of said detected devices;
comparing a representation of the present read state to the respective stored state representation for each of said detected devices;
identifying any state change for each of said detected devices responsive to said comparing of the present read state representation with the stored state representation;
comparing the representation of each of the present read states with a predetermined database of states;
outputting security risk information associated with a device identifier for each of said detected devices, said security risk information responsive to said comparing with the predetermined database of states and further responsive to said identified stage changes; and
controlling communication of each of said detected devices responsive to said output security risk information and device identifier.

14. The non-transitory computer-readable medium according to claim 13, wherein said controlling communication comprises:
selecting for each of said detected devices, responsive to said security risk score, a particular one of a pre-determined plurality of policies; and
commanding at least one of said detected devices to limit communication responsive to said particular policy.

15. The non-transitory computer-readable medium according to claim 13, wherein said controlling communication comprises:
commanding a network switch to shut down a port associated with a particular one of said detected devices.

16. The non-transitory computer-readable medium according to claim 13, wherein said controlling communication comprises one of:
commanding a call manager to limit communication of a particular one of said detected devices; and
commanding a call manager to disconnect an active communication from a particular one of said detected devices responsive to said comparing.

17. The non-transitory computer-readable medium according to claim 13, wherein said controlling communication comprises:
commanding a call manager to disconnect an active communication from a particular one of said detected devices responsive to said comparing.

18. The non-transitory computer-readable medium according to claim 13, wherein said controlling communication comprises:
transmitting one of a reset command and an application session terminate command to a particular one of said detected devices.

19. The non-transitory computer-readable medium according to claim 13, wherein the method further comprises:
providing a state extraction functionality, said reading performed by said provided state extraction functionality; and
programming at least one of the detected devices to transmit changes of state to said provided state extraction functionality.

20. The non-transitory computer-readable medium according to claim 13, wherein the method further comprises:
monitoring session control commands output by at least one detected device; and
adjusting a security setting for said at least one detected device responsive to said monitoring.

21. The non-transitory computer-readable medium according to claim 13, wherein said controlling communication comprises at least one of: allowing communication; limiting amount of calls; limiting allowed destinations of calls; limiting allowed redirection of calls; and adjusting a password for the detected device.

22. The non-transitory computer-readable medium according to claim 13, further comprising:
translating each of said read states to a common abstract format,
wherein the stored representation of said read state is the read state translated to the common abstract format and the representation of the present read state is the present read state translated to the common abstract format.

* * * * *